O. JAEGER.
DISK DISPENSING DEVICE.
APPLICATION FILED MAR. 23, 1917.
1,268,250. Patented June 4, 1918.
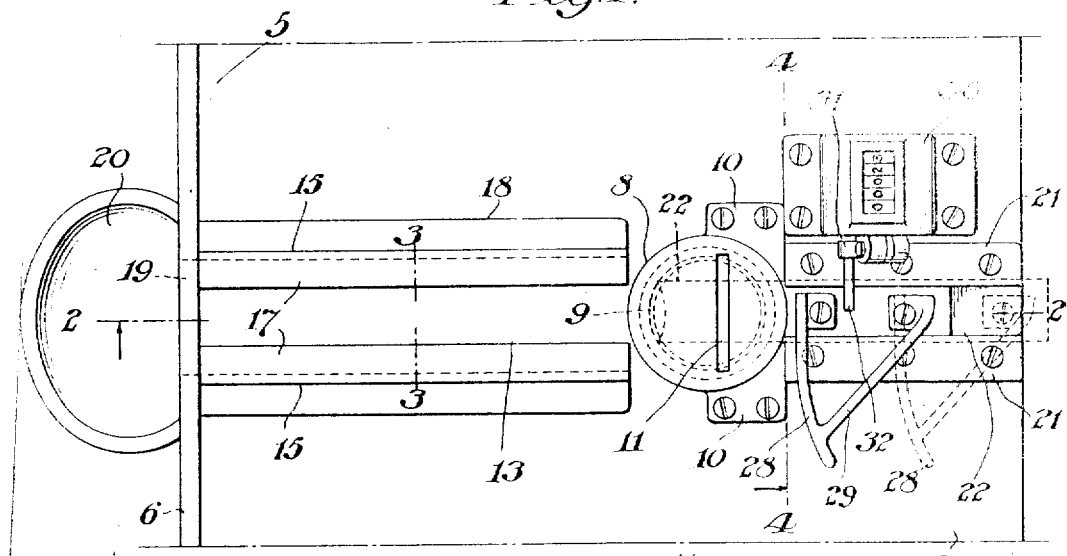
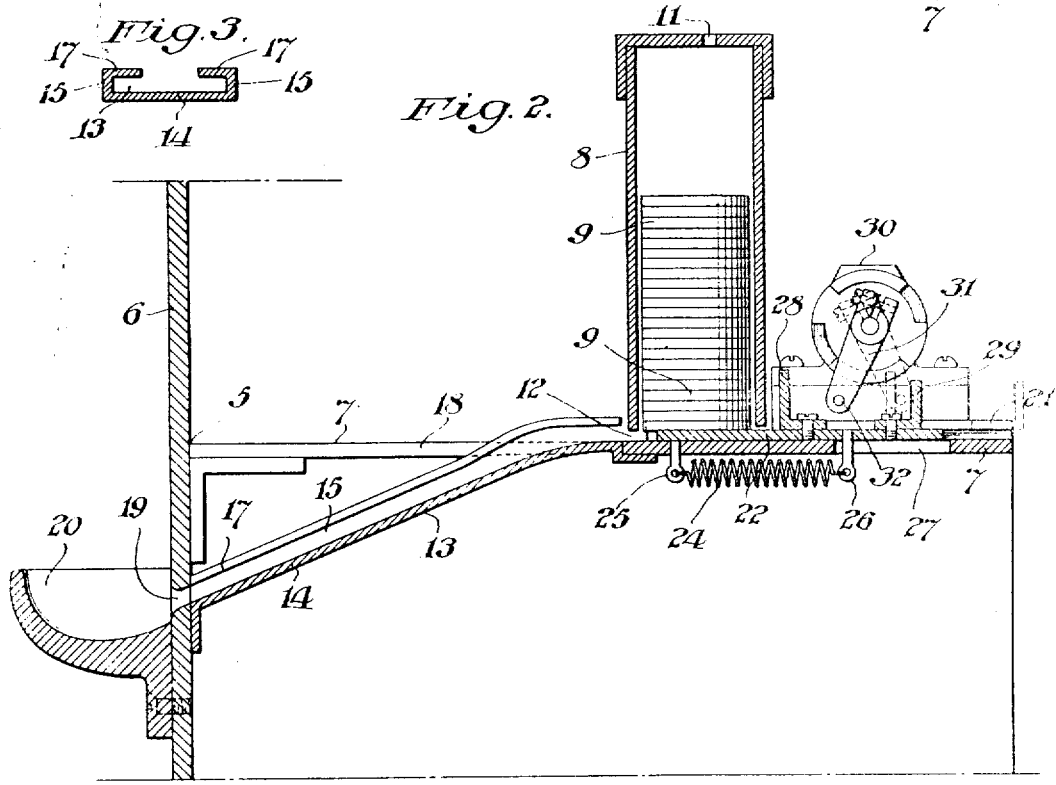
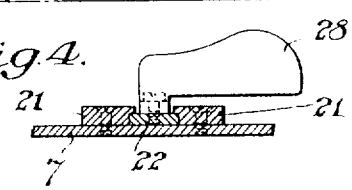
Inventor:
Otto Jaeger
By Fenton & Blount
Attorneys

UNITED STATES PATENT OFFICE.

OTTO JAEGER, OF ELKINS PARK, PENNSYLVANIA, ASSIGNOR TO HARRY S. KELSEY, OF BOSTON, MASSACHUSETTS.

DISK-DISPENSING DEVICE.

1,268,250.  Specification of Letters Patent.  Patented June 4, 1918.

Application filed March 23, 1917. Serial No. 156,840.

*To all whom it may concern:*

Be it known that I, OTTO JAEGER, a citizen of the United States, and a resident of Elkins Park, county of Montgomery, and State of Pennsylvania, have invented certain new and useful Improvements in Disk-Dispensing Devices, of which the following is a full, clear, and exact disclosure, reference being had to the accompanying drawings, forming a part of this specification.

The object of my invention is to provide a novel, simple, and efficient disk dispensing device particularly adapted for use in connection with check-controlled vending machines, and a further object of my invention is to provide a novel means for automatically registering the number of disks dispensed when the dispensing mechanism is operated by hand to dispense the disks.

With these objects in view, my invention consists in the novel construction and combination of parts hereinafter fully described and pointed out in the claims.

My invented device is especially useful in association with the coin receiving and food dispensing devices of what are termed "special order" machines in restaurants of the character know as "automats." These "special order" machines are operated by an attendant behind a suitable partition wall which separates him from the customers using the machines, and they are each provided with a money receiving device, a check or disk controlled, food dispensing device and a check or disk dispensing device. The customer inserts a coin or coins, representing the purchase price of the special order, into the coin receiving device and the attendant, receiving or viewing the coin or coins therein, operates the check or disk dispensing device to deliver a check or disk to the customer who, when the special order is filled and appears in the food dispensing device, inserts the check or disk into the same and thereby gains access thereto for the removal of the order.

In the accompanying drawings illustrating my invention—

Figure 1 is a plan view of a disk dispensing device embodying my invention, part of the frame thereof being broken away.

Fig. 2 is a vertical section thereof, on line 2—2 of Fig. 1.

Fig. 3 is a sectional detail, on line 3—3 of Fig. 1.

Fig. 4 is a sectional detail, on line 4—4 of Fig. 1.

Referring to the drawings, 5 designates a frame or support which includes vertical and horizontal plates 6 and 7, respectively, secured together.

Mounted on the plate 7, a suitable distance back of the vertical plate 6 is a vertically arranged, tubular container 8 adapted to receive the disks 9 to be dispensed, and to hold them in position therein, one above another, as shown in Fig. 2. The container 8 is provided with flanges 10 which extend outwardly from the bottom thereof and which are secured to the plate 7 by suitable screws. The top wall of the container 8 has a slot 11 therein through which disks 9 may be supplied to the container, and the lower portion of the forward wall of the container 8 is cut away to provide an opening or slot 12 through which the disks 9 may be ejected, one at a time.

Extending from a position adjacent to the bottom of the container 8 to the vertical plate 6 is a chute 13 comprising a bottom wall 14 side walls 15 and flanges 17 extending inwardly from the top of the side walls 15. The chute 13 extends through an opening 18 in the plate 7, and it is secured at its lower end to the plate 6 and at its upper end to the plate 7. The upper end of the chute 13 opens directly in front of the opening 12 and is adapted to receive the disks 9 from the container 8, as will be hereinafter described. The lower end of the chute 13 is in registry with a slot 19 in the wall 6 and through which the disks 9 pass after they descend by gravity through the chute 13. As the disks pass from the slot 19 they are received into a suitable dish or cup-like receptacle 20 which is secured on the front of the plate 6 and from which the disks may be readily removed by hand.

Slidable on the horizontal plate 7 and guided by and between plates 21 secured on the plate 7, is an ejector 22 the forward end portion of which enters the lower portion of the container 8 through an opening in the rear wall thereof. The thickness of the ejector 22 is slightly less than the thickness of a disk 9, and the vertical dimension of the opening 12 is slightly greater than the thickness of a disk 9, whereby, when the ejector 22 is retracted from the position shown in the drawings to bring the forward end beneath the rearward wall of the container 8, the disks 9 within the container 8 will fall to the bottom thereof and the lowermost disk will be between the opening 12 and the forward end of the ejector 22, and, when the ejector 22 is then returned to the position shown, the lowermost disk 9 will be ejected from the container 8 through the opening 12 and into the upper end of the chute 13, through which it will then descend by gravity to and through the slot 19 and into the receptacle 20. Thus, each time the ejector 22 is operated as just described, a disk 9 will be ejected from the container 8 and received into the receptacle 20.

The ejector 22 is held normally in the position shown in the drawings, with its forward portion within the container 8 and supporting the disks 9 therein, by a spring 24 one end of which is attached to a pin 25 projecting from the plate 7 and the other end of which is attached to a pin 26 which projects downwardly from the ejector 22 and through a slot 27 in the plate 7; and the ejector 22 is provided with a handle 28 secured thereto and having a suitable brace 29, and by means of which the ejector may be retracted by hand to bring its forward end beneath the rearward wall of the container 8, when the handle 28 is moved from the full line to the dot-and-dash line position shown in Fig. 1 against the action of the spring 24. When the handle 28 is released after being thus retracted, the spring 24 quickly returns the ejector 22 to the position shown, and ejects a disk 9 from the container 8 and into the upper end of the chute 13, as previously described, and causes a rapid descent of the disk through the chute.

Mounted on the plate 7 adjacent to the ejector 22 is a registering device 30 which may be of any well known approved type, having an operating arm 31 resting normally in the full line position shown in Fig. 2 and being movable therefrom to the dot-and-dash line position shown in Fig. 2, and after being thus moved and released, returning automatically to the said full line position, and registering the reciprocations of the arm and indicating the total number of the reciprocations on its face, twenty-three reciprocations being indicated on the face of the device 30 as illustrated in the drawings.

The operating arm 31 of the registering device 30 is provided with a pin 32 which projects into the path of the handle arm 28 of the ejector 22 in such a position that each time the handle arm 28 is moved by hand back to the dot-and-dash line position shown in Fig. 1, and released to eject a disk 9 from the container 8, the handle arm 28 will engage the pin 32 and cause the arm 31 to be reciprocated by moving it back to the dot-and-dash line position shown in Fig. 2 and then releasing it and permitting its return to normal position. Thus each time a disk 9 is ejected from the container 8, the same will be automatically registered by the device 30, and the device 30 will always show on its face the total number of disks ejected from the container 8.

When the device is used in a "special order" machine as hereinbefore mentioned, the vertical plate 6 may form a part of the partition wall which separates the customers from the machine attendant, the attendant operating the handle 28 as previously explained to deliver a disk 9 to the receptacle 20 from which the disk may be taken by the customer purchasing the special order.

I claim:

1. In a device of the character described, the combination of a support, a container adapted to receive a plurality of disks and hold them in position one above another and having a discharge opening therein permitting the disks to be ejected therefrom, an ejector movable to eject disks through said opening, a pin projecting from said support, a pin projecting from said ejector, and tensioning means operative in the line of the path of movement of said ejector and connecting said pins to hold said ejector normally in a position extending into said container, whereby when said ejector is moved from within the container against the action of said spring away from the opening in said container and then released said spring will operate the ejector to eject a disk from the container.

2. In a device of the character described, the combination of a supporting plate having a slot therein, a container rising from said plate and adapted to receive a plurality of disks and hold them in position one above another and having a discharge opening in the lower portion thereof permitting the disks to be ejected therefrom, an ejector mounted on said plate and movable to eject disks from said container through said opening, means projecting from said ejector through said slot, and tensioning means connected to said last-mentioned means and holding said ejector normally in a position whereby when said ejector is moved against the action of said tensioning means and then released said tensioning means will operate the ejector to eject a disk from the container.

3. In a device of the character described, the combination of a supporting plate having a slot therein, a container rising from said plate and adapted to receive a plurality of disks and hold them in position one above another and having a discharge opening in lower portion thereof permitting the
ks to be ejected therefrom, an ejector
unted on said plate and movable to eject
ks from said container through said open-
, a pin projecting downwardly from the
tom of said support, a pin projecting
wnwardly from the bottom of said ejector
d through said slot, and a spring connect-
 said pins and holding said ejector nor-
mally in a position extending into said container, whereby when said ejector is moved from within the container against the action of said spring and then released said spring will operate the ejector to eject a disk from the container.

In witness whereof, I have hereunto set my hand this 19th day of March, 1917.

OTTO JAEGER.